Patented Aug. 3, 1937

2,088,667

UNITED STATES PATENT OFFICE 2,088,667

AMINO-AROYLAMINO-BENZOIC ACID AND PROCESS OF MAKING IT

Francis Leslie Rose, Blackley, Manchester, England, assignor to Imperial Chemical Industries Limited, a corporation of Great Britain No Drawing. Application October 28, 1935, Serial No. 47,199. In Great Britain October 30, 1934

3 Claims. (Cl. 260—109)

This invention relates to new compounds being 2-amino-5-aroylamino-benzoic acids, and to processes of making them.

An object of the invention is to produce new and useful compounds and to produce them by economically and technically satisfactory methods. Other objects of the invention will be in part apparent and in part more fully hereinafter set forth.

The objects of the invention are accomplished, generally speaking, by making 2-amino-5-aroylamino-benzoic acids and by the processes more fully hereinafter set forth. The objects of the invention are also accomplished in some degree by the products and processes more fully hereinafter set forth.

The new products may be made in the preferred process by nitrating m-aroylamino-benzoic acid and subsequently reducing the nitro group to an amino group, or in an alternative process by aroylating 3-amino-6-acetaminobenzoic acid and thereafter converting the acetamino group to an amino group, e. g. by hydrolysis. The preferred method has the advantages of requiring fewer stages in the process of manufacture and of utilizing commercially available raw materials.

The new intermediates are useful for making azo dyestuffs.

The following examples, in which the parts are by weight, illustrate but do not limit the invention.

Example I 24.1 parts of 3-benzoylaminobenzoic acid were dissolved in 135 parts of concentrated sulfuric acid at 5–10° C.; to that mixture was added with stirring a mixture containing 7.5 parts of nitric acid (sp. gr. 1.5) and 27 parts of sulfuric acid (sp. gr. 1.84). The temperature was kept at 5° C. during the addition, and was raised to and maintained at 20° C. for two hours. The reaction mass was poured on 500 parts of crushed ice, and a solid substance which precipitated on standing over night, was filtered off and washed with water. This solid substance was the crude nitro compound. It was further purified by dissolving in 250 parts of water, making the solution just alkaline to litmus paper by adding calcined sodium carbonate, and salting out. The sodium salt was dissolved in 250 parts of water, and the free acid was formed and precipitated by adding hydrochloric acid. The washed and dried product, 2-nitro-5-benzoylaminobenzoic acid, is a cream colored powder readily soluble in alcohol and slightly soluble in hot water. It is represented by the formula:

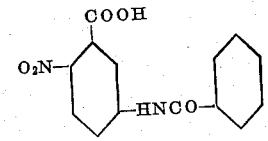

The amino compound was prepared by dissolving 29.6 parts of the 2-nitro-5-benzoylaminobenzoic acid in 250 parts of water by adding sufficient sodium carbonate, the solution was heated to 95° C., and 30 parts of sodium hydrosulfite were added in small portions, the solution being kept just alkaline to litmus paper by additions of sodium carbonate. Reduction proceeded rapidly and was complete when a drop of the reaction liquor showed a permanent strong bleaching action on glazed litmus test paper. The hot liquid was made acid to Congo red paper by adding concentrated hydrochloric acid, and was kept hot until most of the amino acid had precipitated. More precipitate was obtained by cooling and diminishing the acidity of the suspension. The product obtained was 2-amino-5-benzoylaminobenzoic acid. It was filtered off, washed with water, and dried. It is represented by the formula:

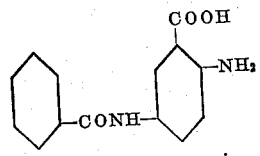

2-amino-5-benzoylaminobenzoic acid was a white powder melting at 245–250° C., and sparingly soluble in water, cold dilute mineral acids, benzene, or acetone. It dissolves readily in hot ethyl alcohol.

Example II 29.8 parts of 3-benzoylamino-6-acetaminobenzoic acid, made by treating 3-amino-6-acetaminobenzoic acid with benzoyl chloride in aqueous suspension in the presence of sodium acetate, were dissolved in 300 parts of water containing 22 parts of aqueous caustic soda (32%). The solution was boiled under a reflux condenser for two hours. 2-amino-5-benzoylaminobenzoic acid identical with the product obtained in Example I was obtained as a precipitate by adding concentrated hydrochloric acid to the cooled solution until it was just acid to blue litmus paper.

As many apparently widely different embodiments of this invention may be made without departing from the spirit and scope thereof, it is to be understood that I do not limit myself to the specific embodiments thereof except as defined in the appended claims.

I claim:
1. 2-amino-5-aroylamino-benzoic acid.
2. The process which comprises dissolving 24.1 parts of 3-benzoylaminobenzoic acid in sulfuric acid, nitrating it, separating out the nitrated product by pouring over ice, purifying it, and reducing the nitro group to amino.
3. The process which comprises nitrating 3-benzoylaminobenzoic acid and reducing the nitro group of the nitro benzoylaminobenzoic acid to an amino group.

FRANCIS LESLIE ROSE.